United States Patent [19]
Iggulden et al.

[11] Patent Number: 5,696,866
[45] Date of Patent: *Dec. 9, 1997

[54] METHOD AND APPARATUS FOR ELIMINATING TELEVISION COMMERCIAL MESSAGES

[75] Inventors: Jerry Iggulden, Santa Clarita; Kyle Fields, El Corado Hills; Alan McFarland, North Hollywood, all of Calif.; Jung-ming Wu, Acton, Mass.

[73] Assignee: SRT, Inc., Cambridge, Mass.

[*] Notice: The term of this patent shall not extend beyond the expiration date of Pat. No. 5,333,091.

[21] Appl. No.: 304,781

[22] Filed: Sep. 12, 1994

Related U.S. Application Data

[63] Continuation-in-part of Ser. No. 177,813, Jan. 4, 1994, which is a continuation-in-part of Ser. No. 2,782, Jan. 8, 1993, Pat. No. 5,333,091, and Ser. No. 103,067, Aug. 6, 1993, Pat. No. 5,455,630.

[51] Int. Cl.$^6$ ........................................ H09N 5/76
[52] U.S. Cl. .................... 386/46; 386/80; 386/81; 358/908
[58] Field of Search ........................... 358/908, 335; 360/14.1, 14.2, 14.3, 33.1, 69, 71, 74.5; 348/46; 386/6-8, 68, 80-81; H04N 5/76

[56] References Cited

U.S. PATENT DOCUMENTS

| | | | |
|---|---|---|---|
| 2,424,216 | 7/1947 | Atkins | 179/1 |
| 2,630,525 | 3/1953 | Tomberlin et al. | 250/6 |
| 2,761,697 | 9/1956 | Jones | 179/1 |
| 3,011,030 | 11/1961 | Langendorf | 179/100.1 |
| 3,424,865 | 1/1969 | Marchand | 178/5.8 |
| 3,628,153 | 12/1971 | Fukata | 325/395 |
| 3,681,523 | 8/1972 | Sidline | 178/6.6 A |
| 3,725,604 | 4/1973 | Alexander | 179/100.1 |
| 3,730,986 | 5/1973 | Morchand | 178/5.6 |
| 3,745,240 | 7/1973 | Morchand et al. | 178/5.6 |
| 4,167,028 | 9/1979 | Tobey | 360/72.2 |
| 4,229,765 | 10/1980 | Sanger | 358/188 |
| 4,259,689 | 3/1981 | Bonner | 358/165 |
| 4,314,285 | 2/1982 | Bonner et al. | 360/33 |

(List continued on next page.)

FOREIGN PATENT DOCUMENTS

| | | | |
|---|---|---|---|
| 0 158 293 | 4/1985 | European Pat. Off. | |
| 0158293 | 10/1985 | European Pat. Off. | |
| 0161512 | 11/1985 | European Pat. Off. | |
| 0 378 393 | 1/1990 | European Pat. Off. | |
| 0 505 683 | 1/1992 | European Pat. Off. | |
| 0 526 739 | 7/1992 | European Pat. Off. | |
| 31 35 806 | 9/1981 | Germany | |
| 32 17 557 | 5/1982 | Germany | |
| A 57088542 | 11/1980 | Japan | |
| 0146072 | 5/1983 | Japan | 360/14.1 |
| 1-174192 | 12/1987 | Japan | |
| 2-58693 | 10/1990 | Japan | 15/87 |
| A 4255949 | 2/1991 | Japan | |
| 4-283 447 | 3/1991 | Japan | |
| 3-292655 | 6/1991 | Japan | 15/2 |
| 03292655 | 12/1991 | Japan | |
| 2 246 233 | 7/1990 | United Kingdom | |
| WO 81/00945 | 4/1981 | WIPO | |

*Primary Examiner*—Thai Tran
*Attorney, Agent, or Firm*—Blakely, Sokoloff, Taylor & Zafman

[57] ABSTRACT

During recording of a television signal on a VCR, data are accumulated with respect to the time of occurrence and duration of detectable events, such as blank frames, in the television signal, and such data are stored. Subsequent to the recording process, the stored data are analyzed to classify the content of the television signal between the detectable events as commercial or non-commercial. The video tape is then marked at the beginning and ending of each commercial group. During playback, the VCR is automatically commanded into a fast scan mode when the tape reaches the beginning of a commercial group. The VCR is then automatically commanded to return to the normal "play" mode when the tape reaches the ending time of that commercial group. Since all of the television signal is recorded on the tape, any or all of the signal may be viewed at the discretion of the viewer.

42 Claims, 9 Drawing Sheets

U.S. PATENT DOCUMENTS

| | | | |
|---|---|---|---|
| 4,319,286 | 3/1982 | Hanpachern | 360/33 |
| 4,325,088 | 4/1982 | Wright | 360/14 |
| 4,343,024 | 8/1982 | Kawai | 360/745 X |
| 4,390,904 | 6/1983 | Johnston et al. | 358/335 |
| 4,430,676 | 2/1984 | Johnson | 360/13 |
| 4,492,993 | 1/1985 | Otis | 360/74.5 |
| 4,520,404 | 5/1985 | Von Kohorn | 358/335 |
| 4,570,192 | 2/1986 | Hori | 360/14.2 |
| 4,587,572 | 5/1986 | DiGiudo | 360/14.3 |
| 4,602,297 | 7/1986 | Reese | 360/14.1 |
| 4,605,973 | 8/1986 | Von Kohorn | 358/335 |
| 4,618,895 | 10/1986 | Wright | 358/311 |
| 4,703,311 | 10/1987 | Roggendorf | 340/347 |
| 4,707,749 | 11/1987 | Nishijima et al. | 360/14.3 |
| 4,750,052 | 6/1988 | Poppy et al. | 358/335 |
| 4,750,053 | 6/1988 | Allen | 358/335 |
| 4,750,213 | 6/1988 | Novak | 455/107 |
| 4,752,834 | 6/1988 | Koombes | 358/908 X |
| 4,762,401 | 8/1988 | Faerber et al. | 358/335 |
| 4,774,600 | 9/1988 | Baumeister | 360/14.3 |
| 4,782,401 | 11/1988 | Faerber et al. | 358/335 |
| 4,879,611 | 11/1989 | Fukui et al. | 360/69 |
| 4,882,783 | 11/1989 | Roggendorf | 360/134 |
| 4,918,531 | 4/1990 | Johnson | 358/183 |
| 4,979,047 | 12/1990 | Wine | 358/335 |
| 5,018,027 | 5/1991 | Roggendorf | 360/14.2 |
| 5,019,899 | 5/1991 | Boles et al. | 358/84 |
| 5,057,932 | 10/1991 | Lang | 358/335 |
| 5,063,456 | 11/1991 | Horiuchi et al. | 358/310 |
| 5,075,546 | 12/1991 | Kamada et al. | 250/231.1 |
| 5,151,788 | 9/1992 | Blum | 358/908 |
| 5,333,091 | 7/1994 | Iggulden et al. | 358/908 |

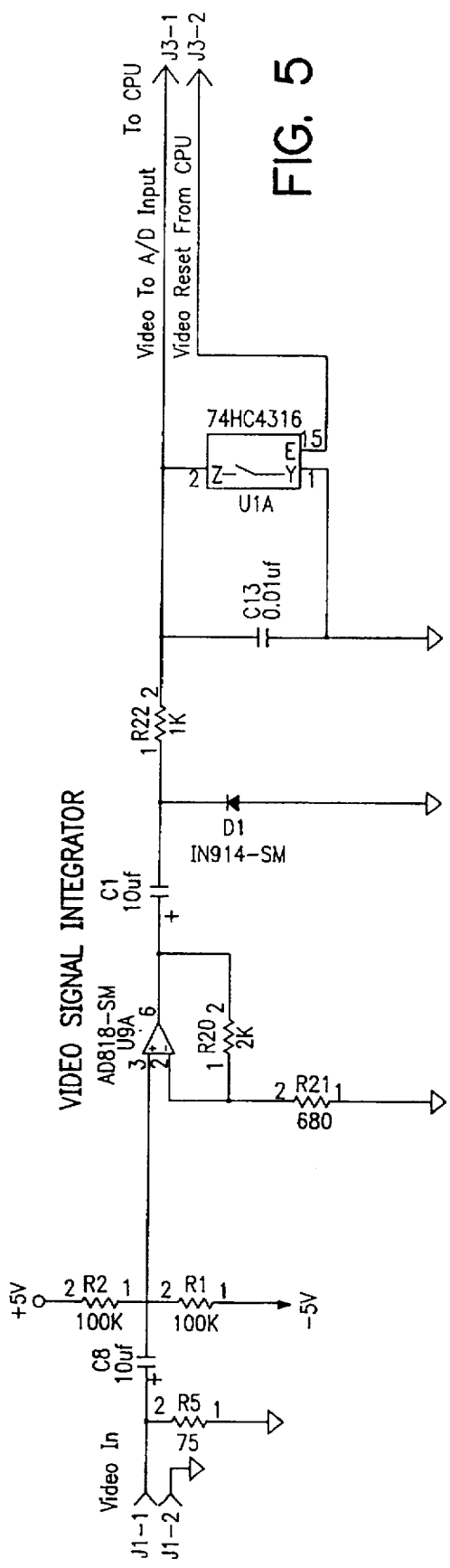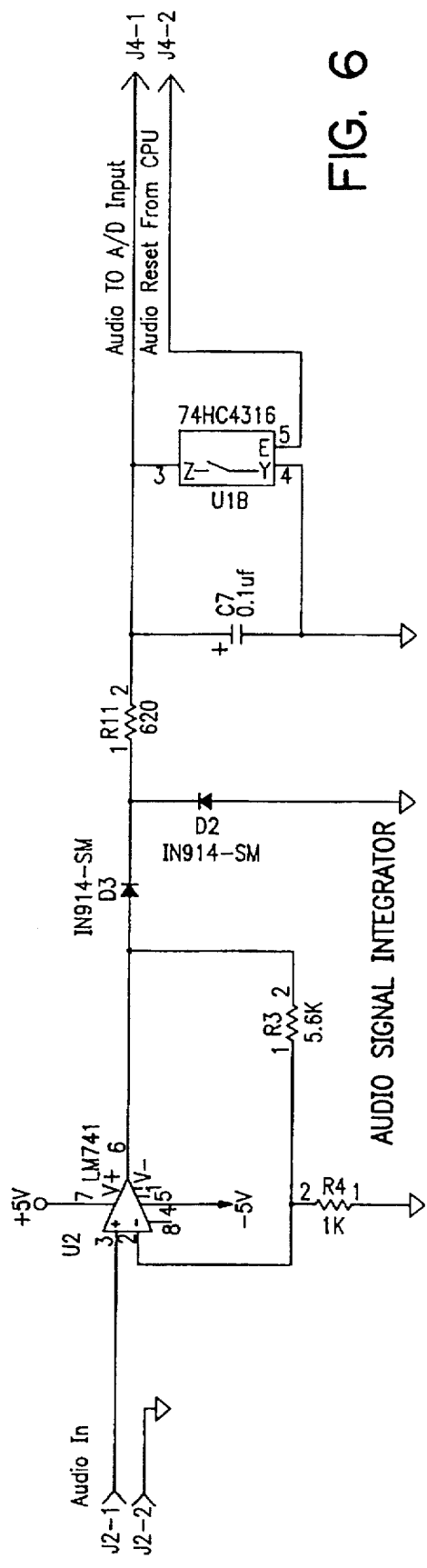
FIG. 5
FIG. 6

V. SYNC SIGNAL

NORMAL CTL
RECORD CURRENT

←60%→

NORMAL CTL
PLAYBACK SIGNAL

OVER-WRITE
RECORD CURRENT 27.5%
←100%→

MARKED CTL
PLAYBACK SIGNAL

METHOD AND APPARATUS FOR ELIMINATING TELEVISION COMMERCIAL MESSAGES

BACKGROUND OF THE INVENTION

1. Related Applications

This is a continuation-in-part of application Ser. No. 08/177,813 filed Jan. 4, 1994 which is a continuation-in-part of application Ser. No. 08/002,782 filed Jan. 8, 1993, now U.S. Pat. No. 5,333,091, and of application Ser. No. 08/103,067 filed Aug. 6, 1993, now U.S. Pat. No. 5,455,630.

2. Field of the Invention

This invention relates to the field of video recording and playback systems, and particularly to a method and apparatus for selectively omitting certain program content during playback of a recorded video signal.

3. Background Art

It is commonplace to record a commercially broadcast television program on a video tape recorder (VTR, also referred to as a video cassette recorder or VCR) for viewing at a later time. When later viewing the recorded program, many, if not most, viewers prefer to watch only the program material without also viewing commercials, promotional messages and the like that are typically broadcast at intervals during the program.

Even before the advent of popularly priced videotape recorders, there have been many attempts to provide home television viewers with a system to suppress commercial messages. Early efforts included systems that would mute the audio signal for a predetermined period of time when a commercial message was sensed. As VCRs became more popular and "time-shifting" became a convenient way to view television programs, more sophisticated methods for eliminating commercial messages have been proposed.

One prior art approach to commercial elimination has been to pause the VCR in the record mode when a commercial message is sensed. A system of this type is disclosed in U.S. Pat. No. 4,319,286, which issued on Mar. 9, 1982 to Hanpachern. In this system, the absence of video modulation during a video frame (i.e., a blank frame) is detected and used to trigger a timing circuit. When triggered, the timing circuit causes a pause command to be sent to a videotape recorder. The pause command remains asserted for a predetermined period of time, or longer if the timing circuit is retriggered. For example, the timing circuit may be set for 32 seconds so that if blank frames are detected at 30 second intervals (a typical length for a commercial message) the VCR will remain in the pause mode until 32 seconds after the last such blank frame. Quite a few prior art references disclose variations on this type of system, wherein the VCR is paused for a fixed period of time following detection of a blank frame in the video signal. For example, PCT Application No. WO81/00945 by Johnston and Koombes discloses a system of this type. Such systems are claimed to be relatively effective for eliminating commercial messages, but suffer certain drawbacks. In this regard, program material immediately following a commercial break is irretrievably lost since the VCR is held in the "pause" mode for a predetermined period of time (30 to 60 seconds or more) following each break in the television signal. Furthermore, additional program material may be irretrievably lost if the timing circuit is falsely triggered, such as by a fade between scenes in the program.

Other prior art systems have sought to overcome these drawbacks. For example, U.S. Pat. No. 5,151,788 to Blum discloses a system for eliminating commercials from a video signal that performs real time analysis of the video signal immediately following a blank frame. If there is a high level of "activity" in the signal immediately following a blank frame, a commercial message is presumed and the VCR is commanded to pause. On the other hand, if a low level of activity is detected, the preceding blank frame is presumed to be a fade and the VCR is commanded to resume recording. This approach solves the problem of losing a fixed amount of program material if a VCR pause if falsely triggered, but it is still susceptible to misclassification. If a program fade is immediately followed by an "active" scene, this will be misclassified as a commercial. On the other hand, a commercial with a low level of "activity" will be misclassified as program material.

A different approach to eliminating commercial messages is to automatically rewind a VCR to the beginning of a commercial message each time one is detected while recording a television program. One such system is disclosed in U.S. Pat. No. 4,750,052, which issued on Jun. 7, 1988 to Poppy and Samelson. A virtually identical system is disclosed in U.S. Pat. No. 4,752,834, which issued on Jun. 21, 1988 to Koombes. In both of these systems, fades (i.e., blank frames) in the video signal are detected and the time interval between successive fades is determined in a timing circuit. If the timing criteria for a commercial message are met, the VCR is rewound to the position of the fade associated with the beginning of the commercial message and the VCR is returned to the record mode. This process repeats for each commercial message that is detected. These systems permit an editing decision to be made after an entire commercial has been aired; however, as with the other systems previously described, program material is still irretrievably lost if there is a false detection of a commercial. Furthermore, the frequent rewinding of the tape during long commercial breaks accelerates the wear of the VCR tape transport mechanism as well as the tape itself.

Yet a different approach is disclosed by Mizuki in Japanese patent document 58-146072, which was published on Aug. 31, 1983. A similar system is disclosed in U.S. Pat. No. 4,570,192, which issued on Feb. 11, 1986 to Hori. In both of these systems, a video program is viewed by an operator as the program is recorded or is replayed. The operator places an electronic mark on the tape at the beginning and end of each commercial message or any other undesired recorded material. When the tape is subsequently replayed, either for viewing or transcription to another tape, the VCR is commanded to fast-forward through the portions of tape bounded by the applied marks. These systems rely entirely on human intelligence to classify the different portions of the video signal.

Still other systems are known that discriminate commercial messages based on characteristics of the transmitted video signal. A system of this type has been marketed in Japan by Mitsubishi under the name "Auto-Cut". In this system, the audio channel is monitored for the presence of a second audio program (SAP) and/or stereo modulation. Many of the programs that viewers wish to tape are broadcast in dual languages (e.g., Japanese and English) and/or with monaural sound. However, commercial messages in Japan are generally broadcast in stereo and in the Japanese language only. Thus, a VCR with the Auto-Cut system is able to record a monaural program or one with SAP and suspend recording during commercials. Other systems marketed in Japan operate on a similar principle, but record the entire program and then place the VCR in a fast scan mode during playback when stereo sound or the absence of SAP is detected.

All known prior art automatic commercial elimination systems rely on real-time signal analysis to classify the broadcast signal as program material or as a commercial message. This is true whether the classification is being performed during the recording or playback process. Prior art automatic systems do not examine detected events in the full context of surrounding events. Thus, misclassification is relatively common. When done during the recording process, such misclassification will cause portions of program material to be irretrievably lost.

SUMMARY OF THE INVENTION

One of the objects of the present invention is to provide a method and apparatus for automatically editing a recorded television signal during playback.

Another object of the present invention is to provide a method and apparatus for determining the presence of a commercial message in a recorded television signal by performing post-recording analysis of the signal.

A further object of the present invention is to provide a method and apparatus by which a television signal may be recorded in its entirety and later replayed such that certain portions of the television signal, particularly commercial messages, are automatically scanned past at high speed.

Yet another object of the present invention is to provide a video tape recorder that incorporates circuitry for automatically identifying commercial groups in a recorded television broadcast and eliminating the commercial groups during replay of the recorded broadcast.

These and other objects of the present invention are achieved with electronic circuitry that may be included within an otherwise conventional VCR. During recording of a television signal, data are accumulated with respect to the time of occurrence and duration of detectable events, such as "black" frames, in the television signal, and such data are temporarily stored. At a time subsequent to the recording session, the stored data are analyzed to classify the content of the television signal between the detectable events. The video tape is then rewound and marks are written onto the tape to identify the beginning and ending of each commercial group.

During playback of the recorded video tape, the VCR is automatically commanded into a fast scan mode when the tape reaches the beginning of a commercial group. The VCR is then automatically commanded to return to the normal "play" mode when the tape reaches the end of that commercial group. Since all of the television signal is recorded on the tape, the entire signal is preserved for viewing at the discretion of the user, even if portions of it have been misclassified.

A commercial detection algorithm uses a list of events comprising the "black frames" (i.e., television frames in which there is no significant video signal) and "silent frames" (i.e., television frames in which there is no significant audio signal) that are typically observed between commercial messages and broadcast programs to detect where the commercial messages begin and end. Each event is analyzed with respect to surrounding events to determine whether the segment of the video signal between events is part of a commercial message or is program material. Contiguous segments that are classified as commercial messages define a commercial group that will be marked for scanning past during playback of the recorded video tape.

BRIEF DESCRIPTION OF THE DRAWINGS

FIG. 5 is a schematic diagram of the video signal integrator of FIG. 4.

FIG. 6 is a schematic diagram of the audio signal integrator of FIG. 4.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods, devices and circuits are omitted so as to not obscure the description of the present invention with unnecessary detail.

U.S. Pat. No. 5,333,091 discloses a control unit that is coupled between a conventional VCR and a conventional television receiver/monitor. This "stand alone" control unit processes the video signal prior to being recorded to detect events within the signal and to modulate the recorded signal with a time code. The spacing and duration of the detected events is analyzed to classify the video signal between events as either program material or commercial message material. A map of the video signal is stored in the control unit. Upon playback of the recorded program, the map is retrieved and control signals are sent to the VCR to rapidly scan through the commercial messages as the program is replayed.

Figure 1:
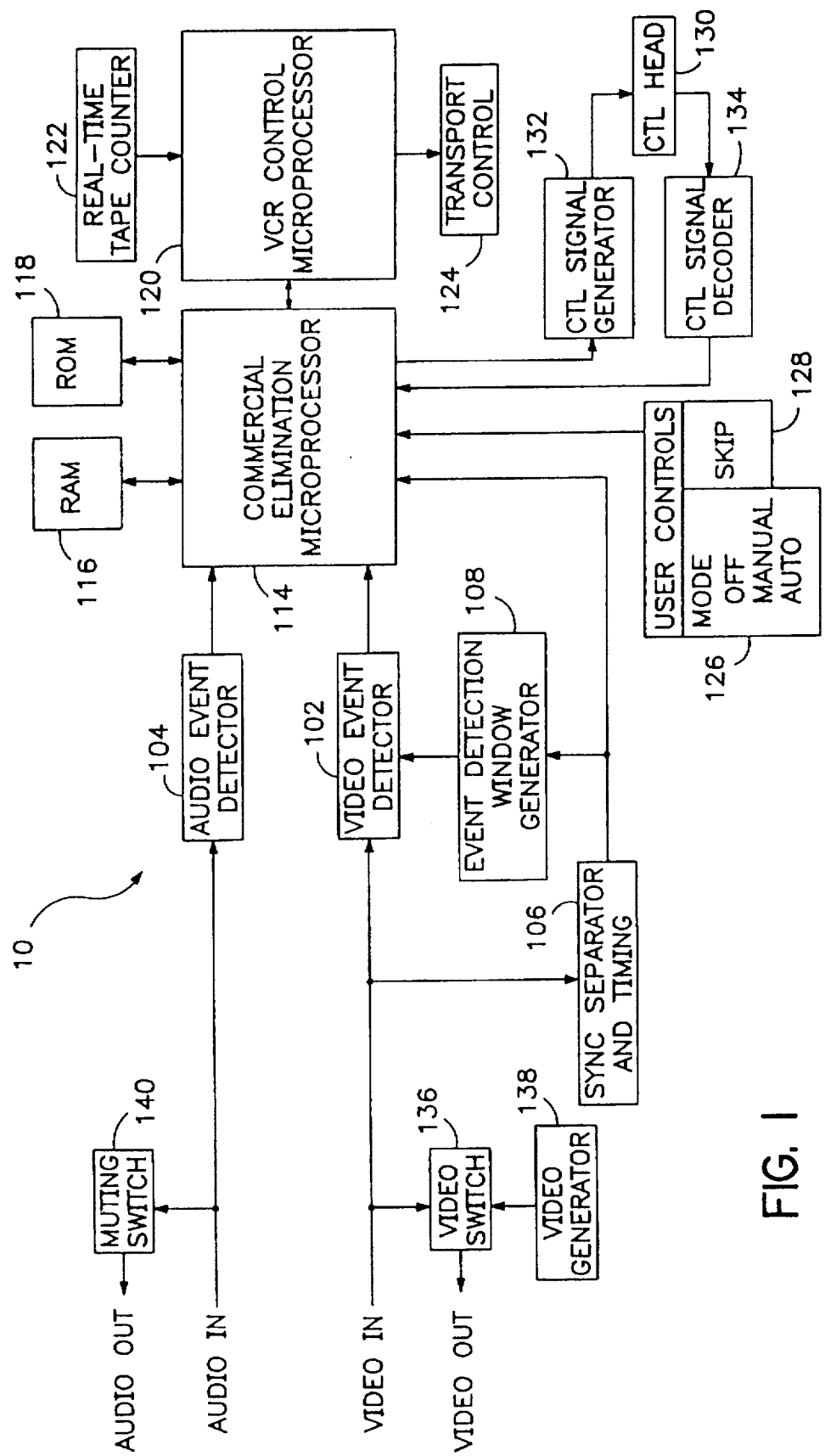
FIG. 1 is a functional block diagram of a commercial elimination system according to the present invention.

The subject of this disclosure is a system functionally similar to that disclosed in U.S. Pat. No. 5,333,091, but which is incorporated within a video recording device such as a VCR. FIG. 1 is a partial block diagram of such a video recording device 10. For clarity, only those functional units related to commercial elimination are shown.

The "VIDEO IN" and "AUDIO IN" signals originate from the VCR tuner in a recording mode of operation or from the VCR playback heads in a playback mode of operation. These signals are applied at video and audio event detectors 102 and 104, respectively, which are more fully described below. The outputs of event detectors 102 and 104 are interrogated by commercial elimination microprocessor 114 to build an event list that will be processed by a commercial detection algorithm.

All commercial detection and elimination functions are controlled by microprocessor 114, which may comprise an 8-bit 8031 chip operating at 30 megahertz. Associated with microprocessor 114 is random access memory (RAM) 116 for scratch pad storage and read only memory (ROM) 118, which stores the operating instructions for processor 114. Microprocessor 114 communicates extensively with VCR control microprocessor 120. With respect to commercial elimination functions, VCR control microprocessor 120 monitors the real time tape counter 122 and controls the operation of tape transport 124. In some embodiments, it may be advantageous to combine the functions of processors 114 and 120 into a single processor.

Nearly all of the functions of commercial elimination microprocessor 114 are automatically controlled. However, two user controls are provided. A MODE switch 126 allows the user to select a fully automatic commercial elimination mode, a manual mode or to disable all commercial elimination functions. A SKIP button 128 provides user control of the commercial skipping function when operating in the manual mode. Controls 126 and 128 may be placed on the front panel of device 10; however, they are preferably included on a remote control transmitter that provides user controls for all of the conventional VCR functions.

The commercial detection algorithm executed by microprocessor 114 identifies the location of commercial groups on a video tape. To implement the commercial elimination feature, the video tape is marked at the beginning and end of each commercial group. These markings are written onto the control track of the video tape with control head 130. During the marking operation, the commercial identification markings are provided by control signal generator 132. When the video tape is replayed, the commercial identification markings are read by control signal decoder 134.

As mentioned above, the "VIDEO IN" and "AUDIO IN" signals originate from the VCR playback heads in the playback mode of operation. During commercial skipping, it is desirable to mute both of these signals. For this purpose, the video signal is routed through video switch 136, which also receives the output of video generator 138. The latter circuit provides a constant video signal, such as a solid blue screen. Other types of video screens may be developed by video generator 138. An operator control may be provided to over-ride video switch 136 if it is desired to view the video signal as commercials are scanned past. Muting switch 140 mutes the audio output signal during fast scan, although this is a feature that is already implemented in most VCRs.

Video event detection

In one embodiment of the invention that is described in detail herein, video event detector 102 detects "black" frames in the video signal. A "black" frame is one in which there is essentially no video signal at all, such as is characteristic of frames immediately preceding and following commercial messages in television broadcasts of the major U.S. networks.

Figure 2:
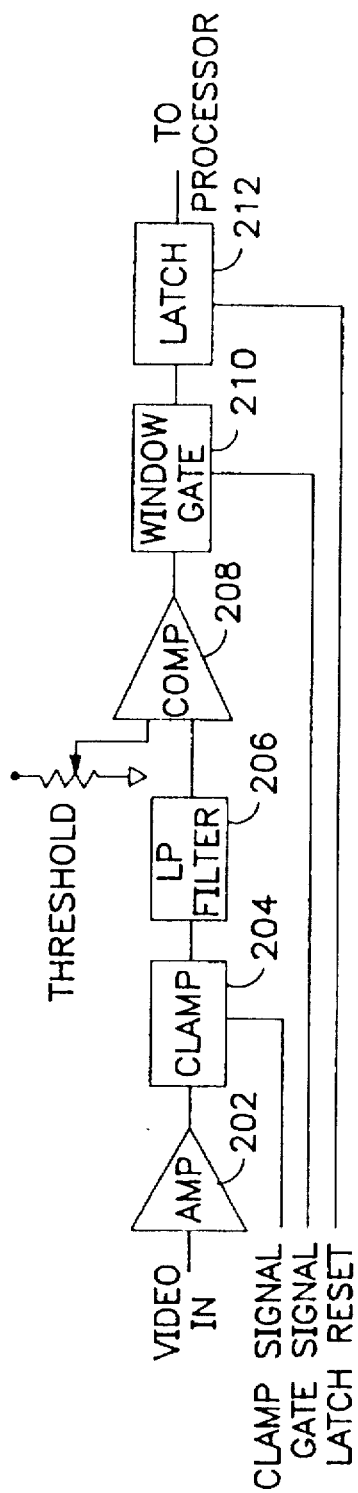
FIG. 2 is a functional schematic of the video event detector circuitry.

The detector 102, shown in greater detail in FIG. 2, monitors the incoming video signal and provides a signal to the commercial elimination processor 114 whenever the video falls within black detect limits. Black frame detection includes the following elements:

Signal clamping, for automatic level control

Filtering to reduce effects of video noise

Comparison to a threshold level

An active area detection window

Latched detection output

The detection of black video level is accomplished by comparing the video level to a precise threshold level in comparator 208. To be effective, this threshold is very near the black video level. Accurate control of the video signal is required to allow for correct detection with changing video signal levels. The input video signal is first amplified by amplifier 202 and then the video level is normalized through the use of a DC clamp circuit 204. This circuit is activated in the back porch area of each horizontal video line. A control pulse signal is generated in surge separator/timing circuit 106 that occurs from the trailing edge of the horizontal sync to the end of the video back porch. This signal drives clamping circuit 204 that sets a DC level in the video signal prior to detection.

There are many types of noise commonly present in video signals. The black detector preferably includes a low-pass filter 206 to provide filtering of fast, spurious luminance signals, characteristic of video "snow". This type of noise is very common and originates from poor video reception and other interference. By providing a high frequency bypass to ground, the effects of such noise are greatly reduced.

Once the video signal has been properly conditioned and filtered, it is compared against the fixed DC threshold level in comparator 208. Any video luminance excursion that exceeds this threshold will change the output state of the comparator. This function requires a relatively high speed signal comparator capable of responding to signal changes in the microsecond range.

Detector 102 is sensitive to video level excursions that exceed a preset level. To prevent false detection, the event detection window generator 108 provides a detection window that gates the detector within a rectangular portion of the viewable screen at window gate 210. Timing for generation of the detection window is provided from sync separator and timing circuit 106, which detects the horizontal and vertical synchronization pulses within the video signal and provides logic level timing signals for the video processing circuitry. Sync separator 106 may be constructed with discrete components using well known video circuits or may utilize a commercially available integrated circuit such as a Motorola MC 44145 device or equivalent.

The rectangular detection window excludes the start and end of the video frame, thereby eliminating video occurring during vertical blanking. The window also excludes the left and right edges of the picture to eliminate false detection due to video effects occurring in the horizontal sync areas of the picture. Some television scrambling systems will produce a video signal at the extreme edges of the picture, and this will be disregarded.

The output of the detection comparator 208 can be a fast pulse, necessitating that it be latched for sampling by the commercial elimination processor. A simple latch device 212 is provided that will capture any detection event occurring during the video frame. Once the state of the latch has been sampled by the commercial elimination processor it is cleared for the next video frame.

Audio event detection

Figure 3:
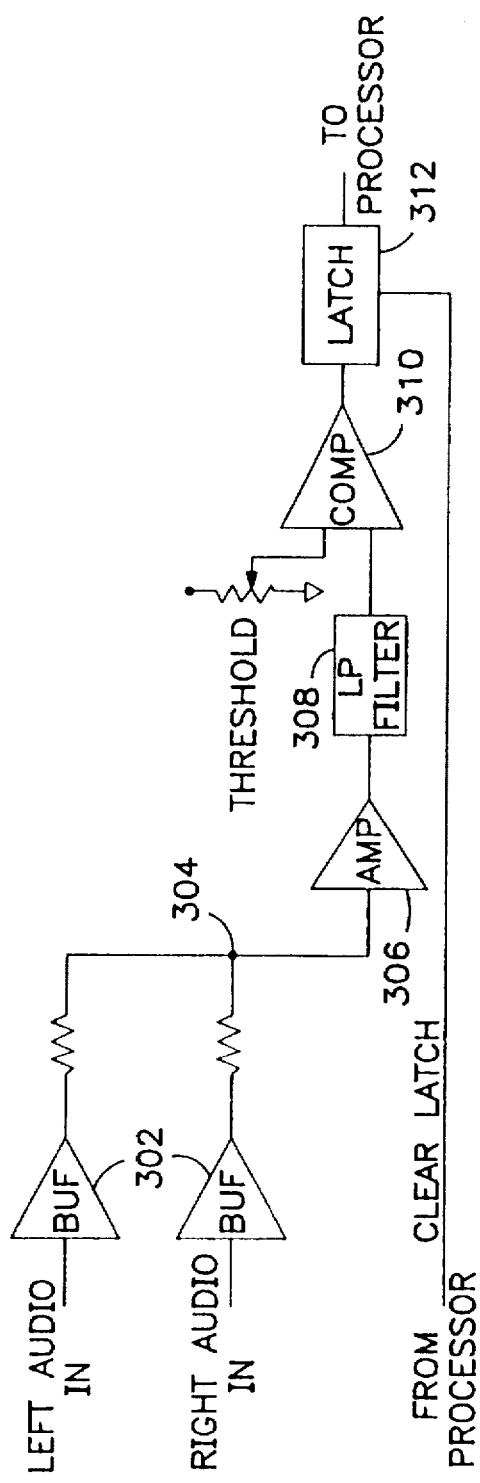
FIG. 3 is a functional schematic of the audio event detector circuitry.

Pauses in television audio are also important indicators for commercial detection, especially when they occur simultaneously with the occurrence of video events such as black frames. The silent frame detector 104, shown in greater detail in FIG. 3, monitors the incoming audio signal and provides an output when periods of silence are detected in the audio. The audio detection circuitry contains the following elements:

Summing of left and right audio channels (if stereo audio)

Amplification of signal prior to detection

Filtering

Comparison to a threshold level

Latching of detection output

The input audio signals from both stereo channels are buffered by circuits 302. For best response, both left and right audio signals are summed together prior to detection. This is easily accomplished using a summing node 304 and simple amplifier 306. The audio level is amplified so that detection of very low level audio is enhanced. An amplification factor of approximately 2 to 4 will provide adequate signal to the audio comparator 310. This amplification also provides AC coupling of the signal to present an audio level that can be easily referenced to ground. Filter 308 removes static and other high frequency noise.

The audio detection is accomplished by comparing the audio level to a fixed threshold level which is set so that any noticeable audio level will exceed this threshold and change the output level of the comparator 310. The output of the level comparator 310 is held by latch 312 so that any fast audio excursion is captured for subsequent sampling by the commercial elimination processor. This sampling is typically accomplished every video frame, at the same time the black detector is sampled.

Alternative event detection

Although it is conventional for television broadcasts within the United States to have black frames preceding and following commercial messages, such is not necessarily the case. Broadcasters could insert virtually any video signal during program breaks. For example, a blue screen could be used (as is the case in France). A constant video signal of this sort, which need not be black, is referred to herein as "flat", i.e., the video signal is essentially constant throughout the frame. Since black frames are a subset of flat frames, video event detection may be implemented to declare an event if the video signal within a field varies from an average value by a predetermined amount.

Frames immediately preceding and following commercial messages may not even be flat. For example, a broadcaster could insert a patterned screen or a solid screen superimposed with the broadcaster's logo. To handle these situations, video event detection may employ a scene change (or cut) detector which compares the video signal within a plurality of screen windows from frame to frame. When the average video signal within any one or more of the windows changes by a predetermined amount, a scene change is declared. If there are two scene changes within a predetermined period of time (e.g., a change from program to a broadcaster logo screen followed by a change to a commercial message) an event is declared. The time interval for declaring an event should be relatively short (on the order of five seconds or less) to minimize the number of false events detected. In some markets, such as Japan, the transition from program to commercial is an instantaneous cut. Detecting commercials in this environment also requires the ability to detect scene changes.

Figure 4:
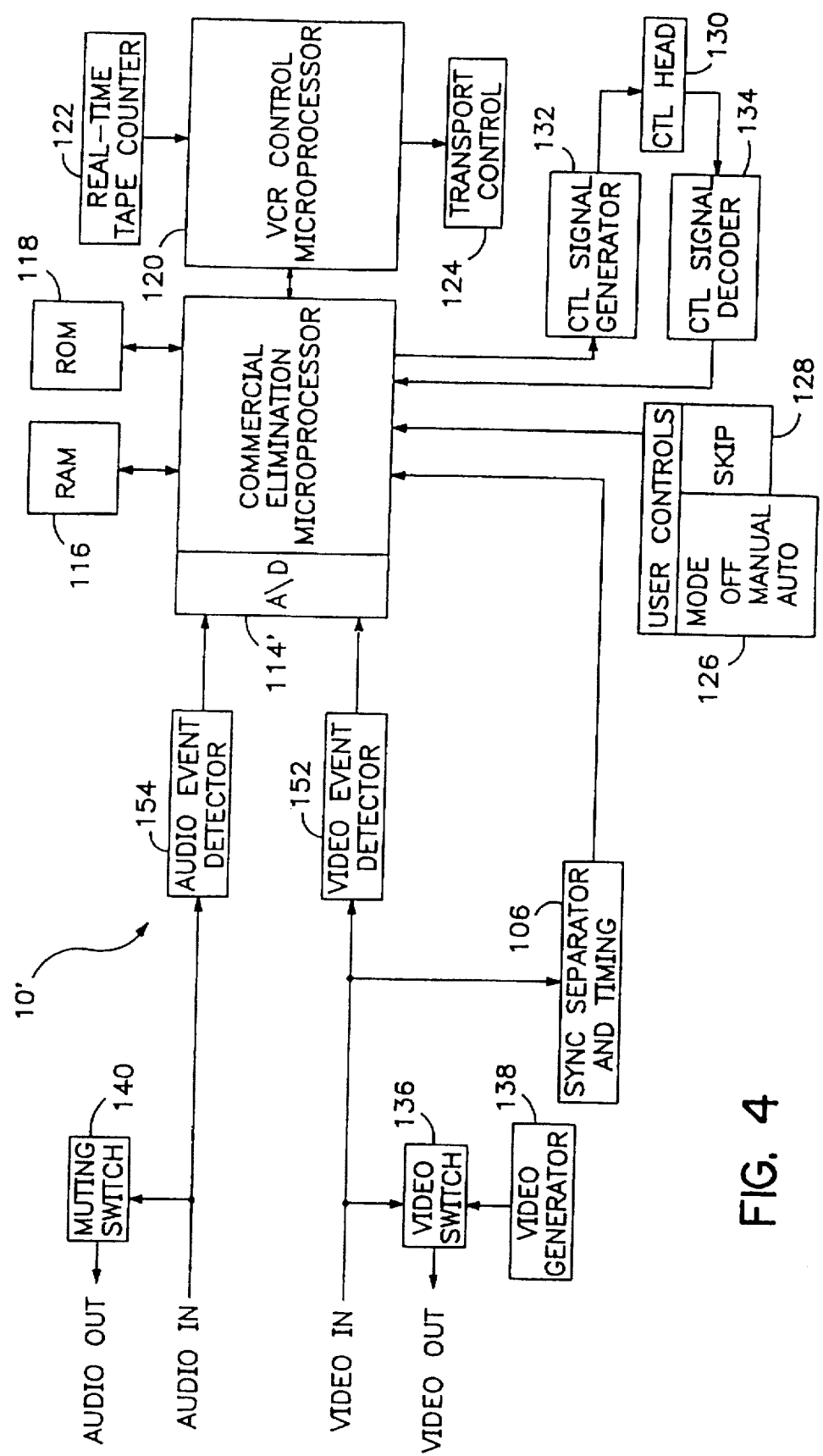
FIG. 4 is a functional block diagram of an alternative embodiment of a commercial elimination system according to the present invention.

With reference to FIG. 4, an alternative embodiment designated generally as device 10' is shown, in which any of the above-described event detection strategies can be selectively implemented. In this embodiment, the actual event detection is performed by software in microprocessor 114' based on digitized samples of the video signal from integrator 152. Processor 114' preferably includes a multiplexed analog-to-digital (N/D) converter. One such processor suitable for this application is the ST9296 from SGS, which has four analog inputs multiplexed to an 8-bit N/D converter.

With additional reference to FIG. 5, the VIDEO IN signal is first level clamped as in the previously described embodiment. The clamped signal is then integrated by amplifier U9A. The video signal is preferably integrated across a complete video line, although less frequent integration may be used as subsequently described. The output voltage of the integrator developed across capacitor C13 is asserted at one of the multiplexed A/D inputs of processor 114' where it is captured for conversion to an 8-bit binary value. The integrator is reset on command from processor 114' with a pulse that activates switch U1A to briefly short the integrator output to ground.

Processor 114' stores each of the binary values which represents the integrated luminance level of the respective video line. It should be noted that it may not be necessary to sample and store the luminance level of every video line. For example, sampling approximately 60 out of the 240 active lines in a video field may be sufficient to characterize the field.

With representative samples of the luminance levels of individual video lines, processor 114' detects the presence of video events. For flat field detection, samples within an entire video field are examined. The maximum and minimum luminance values are located and the difference is computed. This difference is then compared to a predetermined threshold. The field is declared to be "flat" if the difference is below the threshold.

As already mentioned, black fields (or black frames) are a subset of flat fields. To detect a purely black frame, the absolute luminance level of a flat field is tested to determine if it is below a predetermined threshold level.

Scene change detection is also made possible with device 10'. Luminance levels of a video frame are compared to corresponding luminance levels of the following video frame. If a sufficient number of lines exhibit a change in luminance exceeding a predetermined threshold, then a scene change is declared. While it is possible to compare each video line for which a luminance value is determined with the corresponding line of the next frame, efficiency is increased if comparisons are made between corresponding horizontal bands of multiple lines. For example, the screen may be divided into 15 horizontal bands and the luminance levels of lines within each band averaged. The average luminance of each band is then compared to the corresponding value of the following frame.

Referring now also to FIG. 6, an audio signal integrator 154 is illustrated. This is implemented in substantially the same way as video signal integrator 152 although the specific components differ due to the different nature of the signal. The AUDIO IN signal in FIG. 6 is the sum of the left and right channels as in the case of the previously described embodiment. The integrated audio signal voltage developed across capacitor C7 is asserted at a second one of the multiplexed N/D inputs of processor 114'. It should be noted that the audio signal may be sampled at a much slower rate than the video signal, perhaps only once per video frame, in which case silent frame detection involves a simple threshold comparison.

It will be observed that there is no functional unit in device 10' corresponding to the event detection window generator 108 of device 10. As should be apparent, the window function can be readily performed by software in processor 114' which receives the video sync signals as interrupts.

Operational Description

The operating modes of devices 10 and 10' are basically similar to a conventional VCR. Recording and playback of video is accomplished in the same manner as on any other VCR. However, when the commercial elimination feature is enabled, device 10/10' performs additional functions during the various VCR operating modes. Most of these additional functions do not require interaction with the user.

By use of the MODE switch, the user may select between two basic operating modes—manual and automatic. This selection affects the handling of the video tape during the playback phase of device 10/10' as described below. All of the other operating phases of device 10/10' are identical in both manual and automatic modes.

The commercial elimination functions of device 10/10' can best be understood in terms of the various operating phases, each of which is described below.

Recording phase

Figure 7:
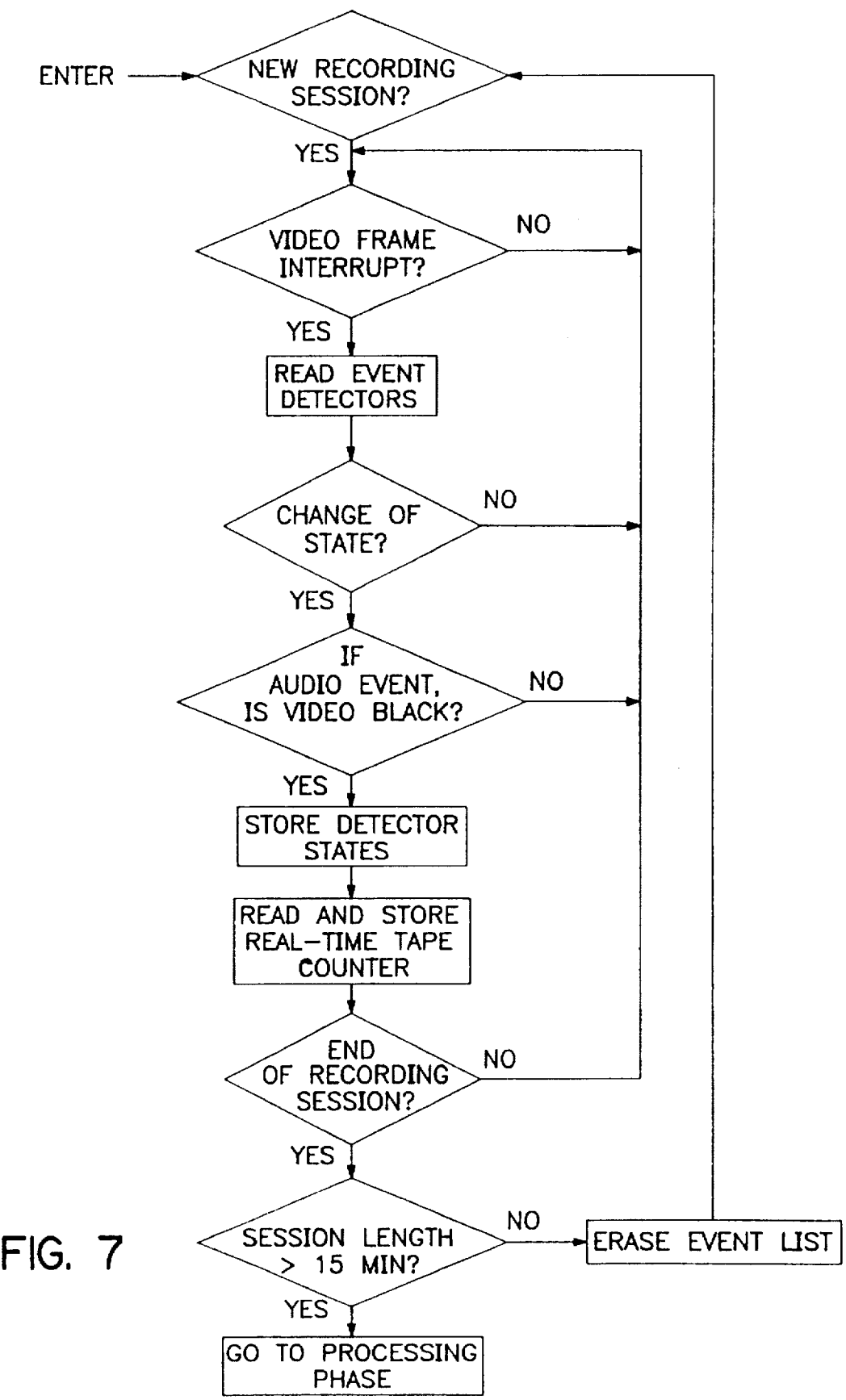
FIG. 7 is a functional flow diagram of the recording phase.

FIG. 7 shows the operations that are performed in the recording phase. From the user's perspective, video programs are recorded as on any standard VCR. However, as indicated in FIG. 7, the device is transparently performing other functions while recording is in progress. A real-time tape counter provides the time and tape location for each detected event. These tape locations will be used during the processing and marking phases to identify and mark the location of commercial groups.

During the recording phase, the event detectors are sampled and the time and tape location of each change of state of the event detectors are stored in an event list in temporary memory. This phase is active whenever the VCR is in record mode (either from key entry, or from timer operation), and the commercial elimination feature is enabled.

In order to reduce the amount of memory required for storage of the event list, only the changes of state of the event detectors are stored in memory. Furthermore, in order to reduce the number of events stored, silent frame events are only stored if the video is also currently black. Each stored event includes the states of the black frame detector and silent frame detector, as well as the current reading from the real-time tape counter. The processing phase uses the time between event changes for the detection of commercial groups. When recording stops, the processor enters the processing phase. If the recording session is less than 15 minutes in length, the stored events may be erased, and the processing phase may be bypassed.

The recording phase is normally terminated whenever the VCR stops recording (whether by manual action, end of tape, timer or other function). After recording, the commercial elimination processor enters the processing phase (described below). At any time during the recording phase the user can disable the commercial elimination feature by setting the MODE switch to OFF. This has the effect of canceling all data stored for the current session and prevents operation of the commercial elimination processing phase.

Processing phase

This phase is active for a short time following the recording phase. Its purpose is to analyze the event list and determine when commercial groups occurred. This process involves applying a commercial elimination algorithm (described below) that analyzes the event list and identifies the occurrence of television commercial groups. The algorithm produces a commercial group list that includes the start and stop point of each commercial group identified within the recording session. This list of commercial groups is used during the tape marking phase to indicate the commercial groups on the video tape. Since the location of individual events is no longer needed, the event data in memory may be erased or overwritten after completion of the processing phase.

Figure 8:
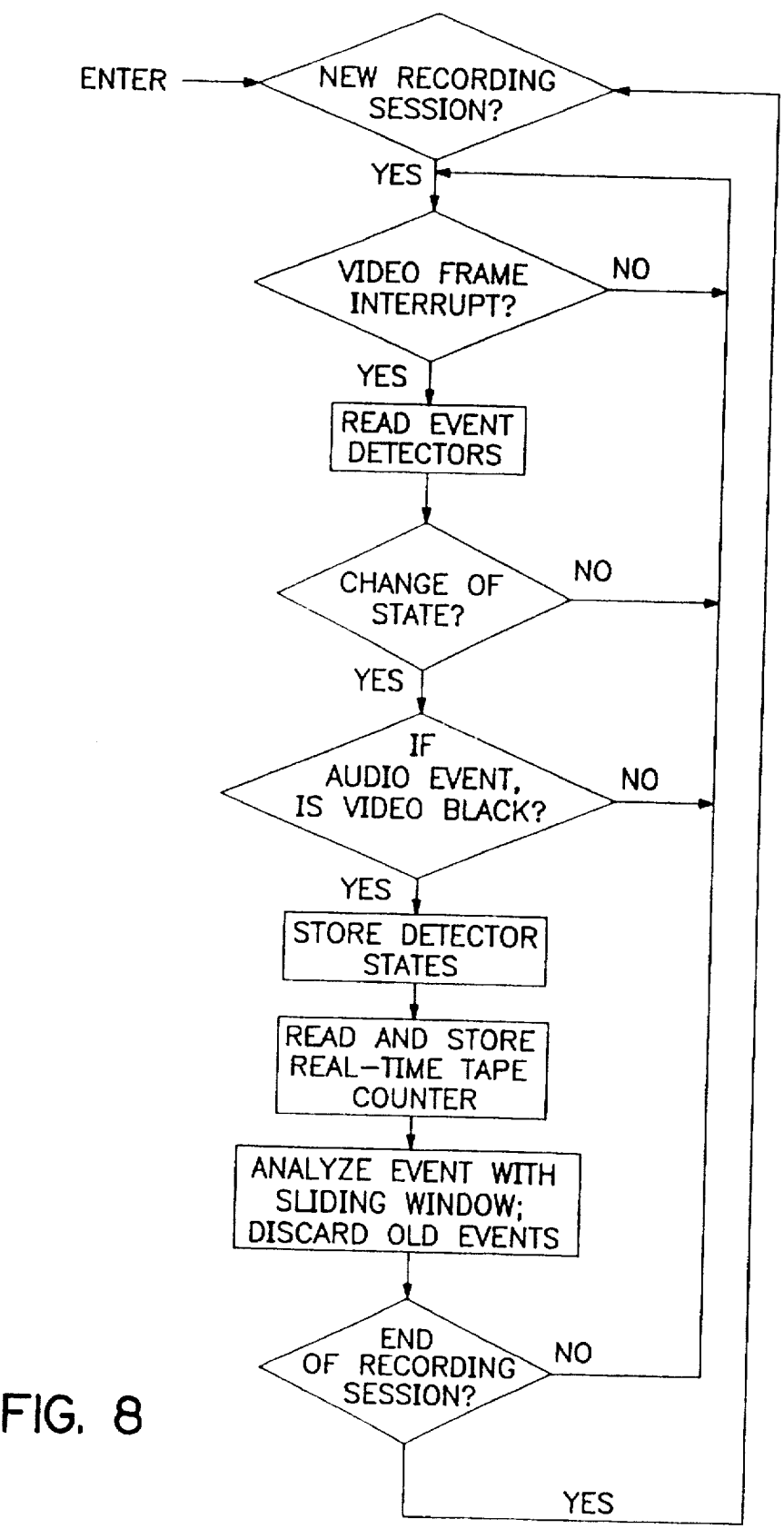
FIG. 8 is a functional flow diagram of the recording phase in an alternative embodiment of the invention.

FIG. 8 illustrates an alternative embodiment, one that is particularly useful if the size of RAM 116 is limited. In this embodiment, the processing phase is integrated with the recording phase so that processing is performed "on-the-fly". The event list is processed continuously with a sliding window having a width of approximately two minutes or as necessary to accommodate the decision rules discussed below. The event list can thus be organized as a first-in-first-out file requiring only a modest amount of RAM since relatively few events occur within a two minute period.

Tape marking phase

Figure 9:
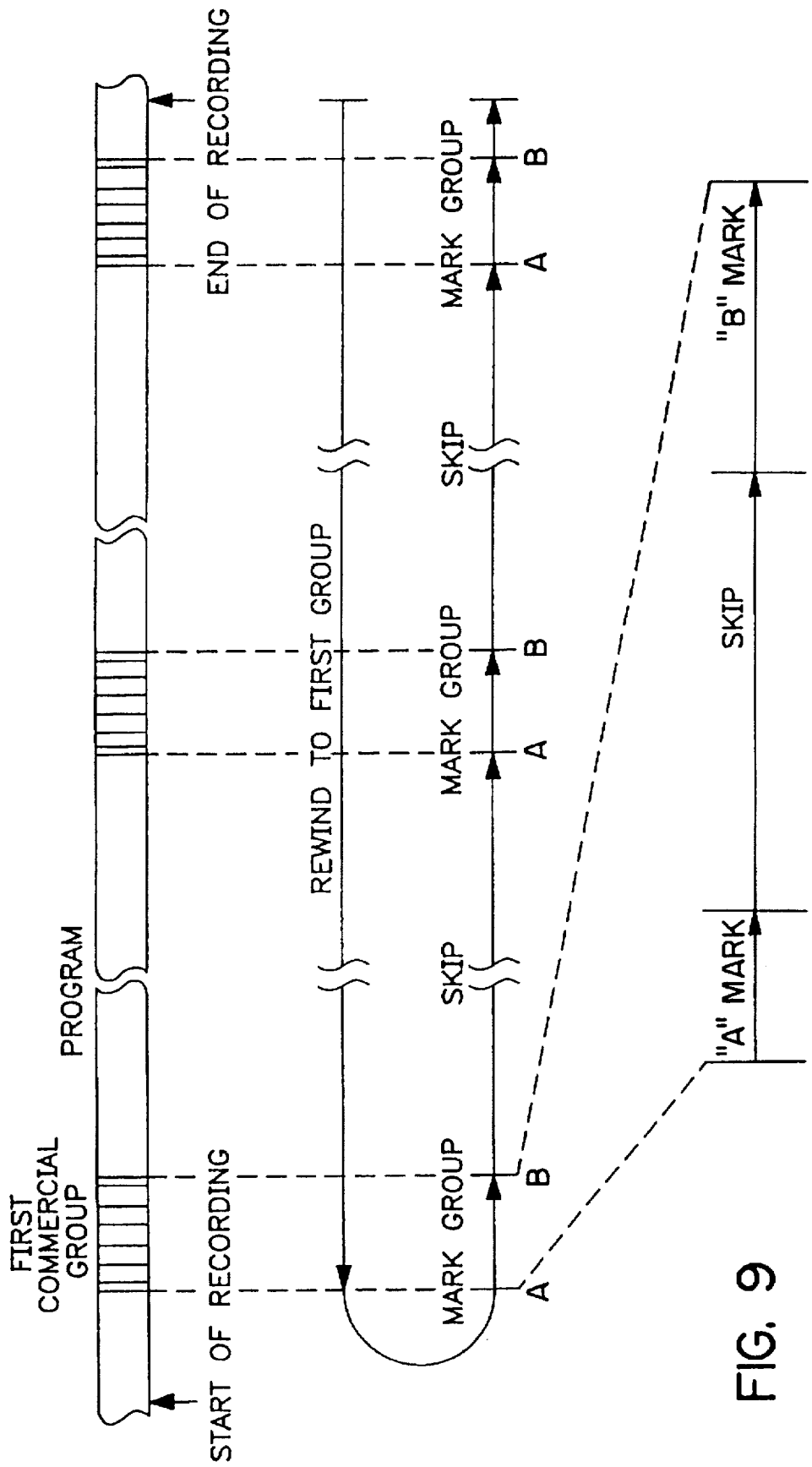
FIG. 9 illustrates the operations performed in the tape marking phase.

FIG. 9 diagrammatically illustrates the tape marking phase operations. After the processing phase is complete, the commercial group list in memory indicates the start and end points of the commercial groups that were identified within the recording session. In the marking phase, the VCR is rewound to the approximate beginning of the first commercial group. The tape is then marked by writing signals on the control track to identify the start and end of each commercial group. The real-time tape counter is used throughout the marking phase to indicate the current tape position to the commercial elimination processor. This is compared to the values stored in the commercial group list to control the tape transport and marking operations. After the entire recording session has been marked (which may take a few minutes), the tape is left positioned at the end of the recording. The VCR returns to standby mode of either Stop or Off (if in Program Timer mode). Upon successful completion of the tape marking phase, the commercial group list in memory may be deleted.

If no commercial groups were detected in the session, the marking phase is not executed, and the VCR returns to normal operation. During the marking phase, the VCR operation can be stopped by the user selecting OFF with the MODE switch, or by pressing STOP on the VCR. This will have the effect of canceling all commercial elimination operational phases, and returns the VCR to Stop mode at its current position. Subsequent selection of MANUAL or AUTO with the MODE switch will not restart commercial elimination operations until the next recording or playback session.

Each commercial group is marked with unique marks at the start (called the "A" mark) and end (called the "B" mark) of the group. This allows device 10 to differentiate the marks, and determine if the tape is entering or leaving a commercial group. The location of the marks is advanced ahead of the actual event, to allow time for the VCR to brake and enter play mode when quickly skipping through a commercial group.

In performing the marking operation, it is important to consider the effect of transport mode changes. Depending on the configuration of the tape transport, errors may occur in the real-time counter when the transport is changed between play, stop, rewind and fast forward modes. Such errors are most likely to occur when changing from an "on-head" mode to an "off-head" mode or vice versa. If the magnitude of these errors is significant, marking should be accomplished using only "on-head" transport modes (e.g., forward and reverse scan) to reduce the cumulative effect of real-time counter errors.

Playback phase

When the VCR is placed into Play mode, and the commercial elimination feature is enabled, the commercial elimination processor samples signals from the tape control track, looking for the marks that indicate the start and end of each commercial group. In the automatic operating mode, the VCR performs the following actions at the start of each commercial group:

the VCR outputs a blue screen (unless blue screen feature is disabled);

the audio outputs are muted; and the tape is advanced at forward scan speed.

When the VCR is skipping and the end of a commercial group occurs, the VCR performs the following actions:

the tape is returned to normal Play mode;

the blue screen video is disabled; and the audio outputs are enabled.

In manual operating mode, no automatic action is taken at the start of a commercial group. During playback in the manual mode of operation, device 10/10' functions like a conventional VCR, except that the user has the option to view or skip commercials. The recorded video signal, including commercials, is played back at normal speed. However, at any time the user can press the SKIP button, which causes device 10/10' to immediately generate a blue video screen, mute the audio, and forward scan to the start of the next program segment, thereby skipping over the current or next commercial group. Note that the VCR will start skipping to the end of the next commercial group as soon as the SKIP button is pressed (regardless of whether the VCR is currently in a commercial or television program segment). The skipping process will automatically stop at the end of the next commercial group.

In order to improve the effectiveness of commercial elimination, it may be desirable to bypass automatic fast scanning of certain commercial groups. In particular, commercial groups at the beginning and ending of a recorded program often contain promotional messages, teasers, program lead-ins/lead-outs and other material that many viewers wish to see. Such materials are often interspersed with commercials and may be classified as such by the commercial detection algorithm. Accordingly, it may be desirable to refrain from automatically fast scanning through commercial groups at the beginning and ending of a recording session. Such groups would nevertheless be marked in the manner previously described and could therefore be scanned through upon actuation of the SKIP button. To obtain the full benefit of this feature, it is preferable that each program which the user desires to record be made the subject of a separate recording session. Thus, even if two programs which the user desires to record are aired back to back, VCR timer commands should be separately entered for each program. Otherwise, lead-ins and lead-outs between the two programs may be automatically scanned through.

Over-ride operation

During the playback phase, the user may wish to stop the commercial skipping process. This can be accomplished in two ways. The user can disable commercial elimination entirely by selecting OFF with the MODE switch. This will cause the VCR to play the tape as would a conventional VCR. No further commercial elimination actions are taken until reenabled by the MODE switch.

Alternatively, the user can temporarily over-ride commercial elimination while the VCR is skipping a commercial group. This is accomplished by pressing Play on the remote control or front panel of the VCR. If the VCR is currently skipping a commercial group, the reception of the Play command will cause the VCR to immediately resume normal play mode and cancel blue screen and audio muting. This feature allows the user to temporarily stop the commercial elimination operation if the user wishes to view the commercial. This feature can also be used in the event that a commercial group is falsely detected during program material. Alternatively, the user can simply press the stop button to stop the VCR.

Over-ride operation does not change the current operating mode and does not disable commercial elimination functions except within the commercial group being skipped at the time of the over-ride. After an over-ride, the VCR will again skip the next commercial group if the automatic mode is selected. Commercial elimination can only be permanently disabled by setting the MODE switch to OFF.

Once a commercial group is over-ridden, device 10/10' will no longer attempt to skip that commercial group while in the automatic mode unless the tape is positioned at least three minutes ahead of the start of the group. This allows the user to back up and view a skipped video segment (which may have been falsely marked as commercial) without the playback phase attempting to skip that video segment again. This will occur when the tape is rewound to any position less than three minutes before the start of the group. However, for playback that occurs more than three minutes from the start of the over-ridden commercial group, device 10/10' will perform the normal commercial skipping process.

Commercial Detection Algorithm

The commercial detection algorithm detects the presence and location of commercial groups within a television program. The algorithm processes data obtained during a recording session in the form of an "event list". The event list is stored temporarily in RAM memory until it is processed, either during or at the end of the recording session. The list contains entries for each occurrence of a change of state of the event detectors. In the described embodiment, the detectors respond to "black" and silent video frames.

By analyzing these events, and the timing relationships between them, the detection algorithm is able to determine the probable locations of commercial groups within the recorded session. The result of this analysis is a commercial group list, which indicates where the commercial groups start and end on the video tape.

Each event in the event list contains two flags, one for the current state of the black frame detector and one for the current state of the silent frame detector. In addition, the real-time tape counter value for the event is also stored.

The detection algorithm determines the length of the events (such as how long a black video scene lasted), as well as the time between two or more subsequent events. By applying a set of logical rules, the algorithm determines if the segment defined between two events is a commercial or a program segment. The algorithm takes each event and processes all other events that occur up to approximately two minutes later. For each of these subsequent events, the time differential dt is calculated and the following decision rules are implemented:

1. Is dt less than or equal to 31 seconds?
2. Is dt less than 62 seconds and greater than 58 seconds?
3. Is dt less than 92 seconds and greater than 88 seconds?
4. Is dt less than 122 seconds and greater than 118 seconds?

If there is an affirmative response to any one of the decision rules, the corresponding segment following the event being examined is considered to be a commercial.

It will be recognized that the above-stated decision rules may be supplemented with additional rules to enhance the accuracy of commercial detection. Efforts are ongoing to determine an optimum rule set. At the cost of greater complexity, the rules may be adaptively changed for the particular recording environment. For example, different rules may be invoked as functions of the time of day, broadcast channel, etc.

After analyzing the event list data, the algorithm has determined the suspected locations of individual commercials within the recorded session. The next step is to combine these individual commercials into groups of commercials.

Commercial groups consist of two or more individual commercials—it is presumed that a single commercial will not be broadcast in isolation. By calculating the start and end times of each commercial group, the algorithm generates a commercial group list, which is also stored in RAM memory. A group is saved only if the total duration of the group is greater than 50 seconds.

Once the commercial group list is completed, or more frequently if on-the-fly processing is used, the event list can be erased from RAM memory since it is no longer needed. As described above, the commercial group list is used during the marking phase to control the placement of the start and end commercial group tape marks. Upon completion of the marking phase, the commercial groups can also be erased from RAM memory since the video tape is now permanently marked with the locations of each commercial group.

Control Track Marking

The device of the present invention applies the commercial elimination "A" and "B" marks to the control (CTL) track of the video tape. The hardware required to support this marking feature already exists in most VCRs. The "A" and "B" marks modify the duty cycle of the synchronization signal written onto the control track at the time the program was recorded. Many VCRs currently implement a similar feature for placing index marks on the tape. The marking approach utilized with the present invention is similar to the one described by Hod in U.S. Pat. No. 4,570,192.

Figure 10:
FIG. 10 illustrates over-writing the control track signal to place commercial elimination marks on the video tape.
Figure 10:
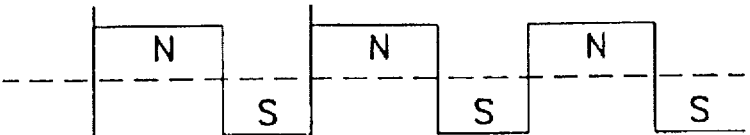
Figure 10:
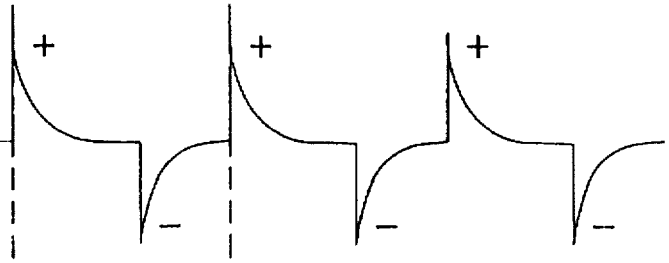
Figure 10:
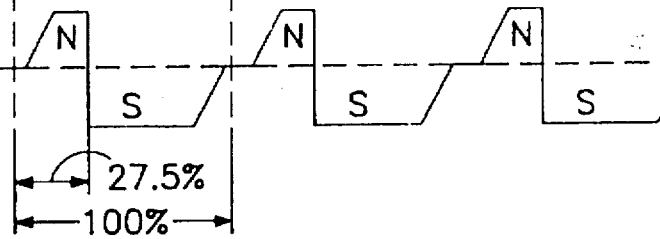
Figure 10:
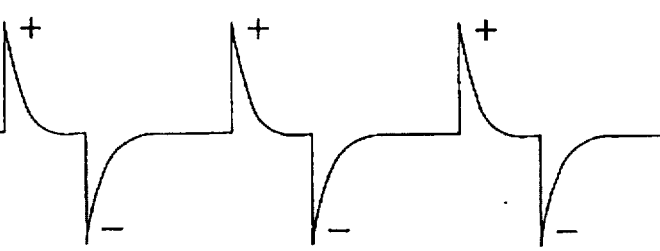

Referring to FIG. 10, the video tape control track signal, as defined in the published standards for the VHS format, consists of a periodic signal in synchronization with the video frame timing. The signal is recorded with a rectangular wave format, and read back from the tape as a differentiated pulse train. The pulses indicate the rising and falling edges of the control track pulse signal. For video tape synchronization (tracking), the rising edge of the signal (positive playback pulse) is used to control the tape motor servos; the falling edge (negative playback pulse) is ignored. Therefore, as long as the rising edges of the control track signal are not disturbed, the duty cycle of the control track signal can be altered without affecting the operation of the video servo system.

When overwriting the control track with "A" and "B" marks, the VCR detects the control track signal and waits until just after the rising edge is detected before enabling control track record current. After the rising edge is detected, the write current is enabled and the timing of the duty cycle measured to control the polarity of the applied signal. The head write current is disabled before the actual end of the pulse in order to prevent overwriting the next rising edge of the control track pulse.

In order to improve compatibility with various VCR models, and to reduce noise associated with fast rise time signals, the leading edge of the overwrite wave form is preferably ramped. This improves readability when transferring a video tape between machines, that may have different head alignments or track widths.

Figure 11:
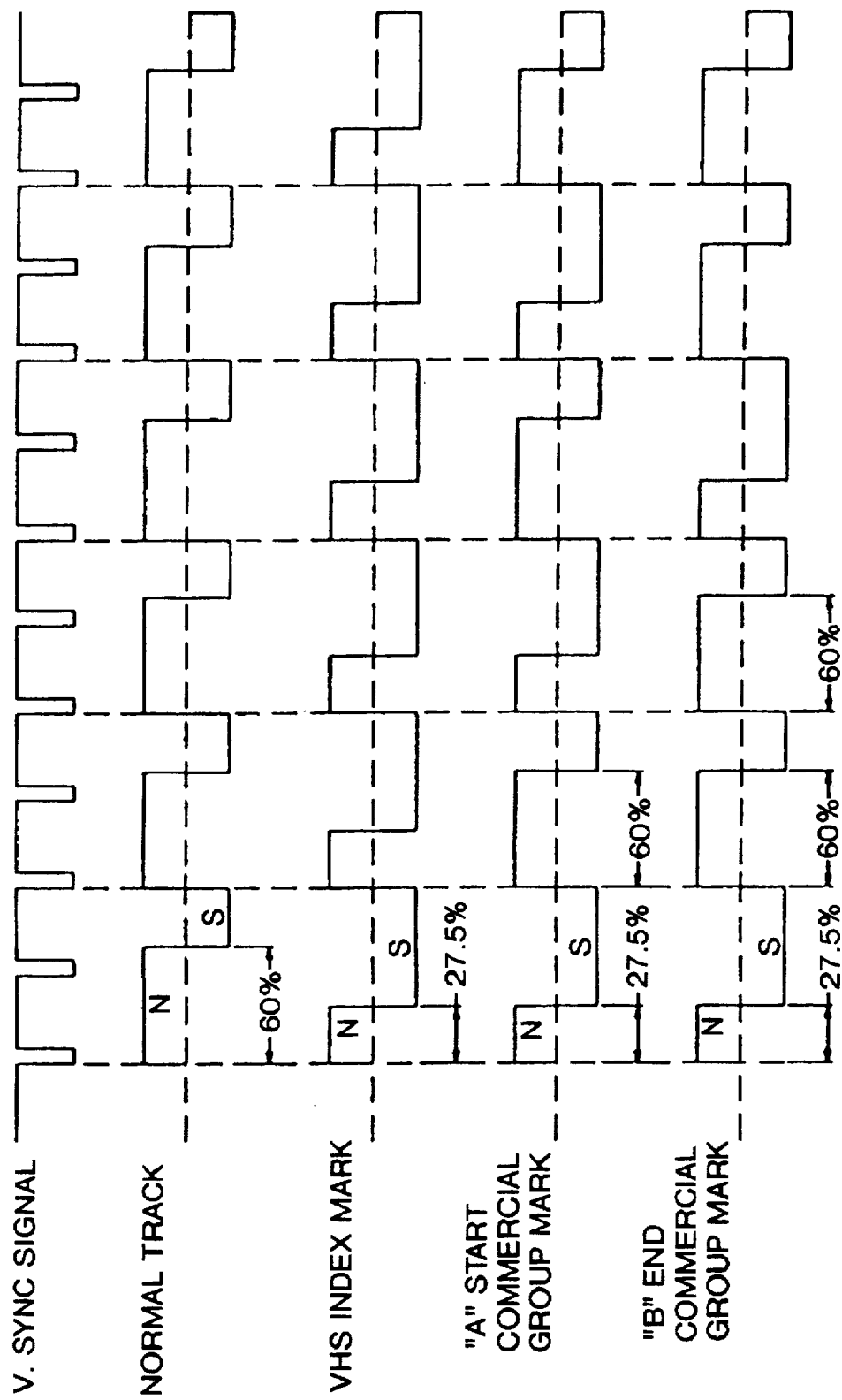
FIG. 11 illustrates the formats of the commercial elimination tape marks.

The format of the "A" and "B" marks is illustrated in FIG. 11. The "A" mark indicates the start of a commercial group. The duty cycle of the control track signal is changed to an alternating sequence of 27.5% and 60% cycles. This duty cycle pattern begins sufficiently before the group start, to permit reliable detection in the play mode. This may require only a few frames, but the mark can be of any convenient length.

The "B" mark indicates the end of a commercial group. The duty cycle of the control track signal is changed to a repeating sequence of 27.5%—60%—60% cycles. This duty cycle pattern begins substantially before the group end, and continues until the actual end of the commercial group. This marking period allows for detection of the mark in fast scan mode, with enough time for the tape transport to stop prior to the end of the commercial group. In some VCR tape transports, the forward scan rate can be as much as 35 times the rate of normal play. In such machines, the lead time between the start of the "B" mark and the end of the commercial group may need to be ten seconds or more to insure that the mark is read and the VCR can return to normal play without over-shooting the start of the next program segment.

VHS indexing marks are also coded on the control track using a variable duty cycle. Index marks are typically recorded on the video tape at the start of a recording, or they can be manually written or erased in some VCR models. The VHS index mark consists of a solid pattern of 27.5% duty cycle signals. In order to insure reliable detection of an index mark without interference by commercial elimination marks, the VCR control software should require at least two successive frames of video at the 27.5% duty cycle for identification of an index mark. Requiring two frames for index mark detection allows the VCR to differentiate between the "A" and "B" marks (which do not have two successive frames of 27.5% duty cycles) and normal index marks.

The marking operation, briefly described above in connection with FIG. 10, is accomplished with the following steps:

1. Rewind to the start of the first commercial group in the recording session.

2(a). Overwrite control track with "A" mark at the start of the group.

2(b). Begin fast forward or scan toward the end of the group.

2(c). Stop 10 seconds (or as far in advance as required) prior to the end of the group, and enter play mode.

2(d). Overwrite control track with "B" mark until end of the group.

2(e). Fast forward until start of next commercial group.

3. Repeat 2(a)–(e) above for all commercial groups.

4. Fast forward to end of recording session and stop.

Information decoding

It will be recognized that the video event detection capability of device 10/10' has the inherent capability for decoding information modulated on the video signal. Individual video frames can be modulated as black or non-black to provide a simple binary coding scheme. Although this affords a relatively low data rate, it can be an effective way to transmit data to device 10 if only black frame detection is provided. One application for such data communication is the transmission of time-of-day information so that the built-in clock of device 10 will always have the correct time. Inexpensive television broadcast time is often available in early morning hours. Such time can be advantageously utilized to transmit information to all receiving devices. The devices can be preprogrammed to scan for information at certain times of the day when normal use of the device is unlikely. Thus, for example, the device may enter a scan mode at 3 a.m. to search for a data header encoded with black frames. When the header is located, the data which follows is decoded and stored in processor 114. Aside from time-of-day, the coded information may include, for example, new operating instructions for processor 114. In this way, the commercial elimination algorithm can be periodically and automatically updated.

It should be apparent that the data communication bandwidth can be substantially higher in device 10' since up to each video line can be sampled. If all video lines are utilized to encode individual data bits, the communication bandwidth increases to 15.7 kHz.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A method of eliminating commercial messages during playback of a television program recorded on a recording medium comprising the steps of:
   (a) detecting events in a television signal carrying the television program as the television program is recorded;
   (b) for an analyzed one of said detected events, looking for a neighboring detected event within a plurality of time windows;
   (c) classifying a segment of the television signal adjacent to said analyzed detected event as commercial if said neighboring detected event is found within any one of said plurality of time windows, otherwise classifying said segment of the video signal as non-commercial;
   (d) storing a classification result for said segment of the television signal together with data representative of a location of said segment of the television signal on the recording medium;
   (e) replaying the recorded television program from the recording medium at a normal rate of play during segments of the television signal classified as noncommercial and at a higher than normal rate of play during segments of the television signal classified as commercial.

2. The method of claim 1 further comprising the step, after step (d), of writing a mark on the recording medium proximate to said location of said segment of the television signal if said segment is classified as commercial.

3. The method of claim 2 wherein the recording medium is a video tape and said mark is written on a control track of the video tape.

4. The method of claim 2 wherein said mark comprises a first mark proximate to a beginning of said segment of the television signal.

5. The method of claim 4 further comprising the step of writing a second mark on the recording medium proximate to an ending of said segment of the television signal.

6. The method of claim 5 wherein the recording medium is a video tape and said first and second marks are written on a control track of the video tape.

7. The method of claim 6 wherein the first and second marks each comprise a frame synchronization clock signal having respective first and second duty cycle patterns different from each other.

8. The method of claim 7 wherein the control track normally has a frame synchronization clock signal having a third duty cycle pattern different from both of the first and second duty cycle patterns.

9. The method of claim 8 wherein the first duty cycle pattern is a repeating sequence of a first duty cycle $D_1$ and a second duty cycle $D_2$ of the form $D_1D_2D_1D_2\ldots$.

10. The method of claim 9 wherein the second duty cycle pattern is a repeating sequence of $D_1$ and $D_2$ of the form $D_1D_2D_2D_1D_2D_2\ldots$.

11. The method of claim 10 wherein the third duty cycle pattern is a substantially constant duty cycle having a value approximately equal to one of $D_1$ and $D_2$.

12. The method of claim 5 wherein the second mark begins substantially before the ending of said segment of the television signal.

13. The method of claim 1 wherein the events comprise television frames in which a video component of the television signal remains below a predetermined threshold.

14. The method of claim 1 wherein the events comprise television frames in which an audio component of the television signal remains below a predetermined threshold.

15. The method of claim 1 wherein the events comprise television frames in which a video component of the television signal signal remains at a substantially constant level.

16. The method of claim 1 wherein the events comprise a pair of video image changes in rapid succession.

17. In combination with a video cassette recorder for recording a television signal on a video tape, said television signal carrying a television program, and for replaying the television program from the recorded video tape, a device for eliminating commercial messages during replay of the television program comprising:
   means for detecting an event in the television signal as the television program is recorded;
   means for storing data representative of a tape location for said detected event;
   means for analyzing said detected event to classify a segment of the television signal adjacent to said detected event as one of commercial and non-commercial;
   means for automatically marking the video tape with a signal to identify segments of the television signal classified as commercial;
   means for rapidly advancing the video tape through the segments of the television signal classified as commercial when the television program is replayed.

18. The device of claim 17 wherein the means for detecting events comprises a circuit for detecting frames of the television signal in which a video component of the television signal remains below a predetermined threshold.

19. The device of claim 17 wherein the means for detecting events comprises a circuit for detecting frames of the television signal in which an audio component of the television signal remains below a predetermined threshold.

20. The device of claim 17 wherein the means for analyzing the detected events comprises means for determining if a first detected event has a neighboring second detected event within one of a plurality of time windows.

21. The device of claim 17 wherein the means for automatically marking the video tape comprises a head for magnetically encoding a control track of the video tape.

22. The device of claim 21 wherein the means for automatically marking the video tape further comprises a circuit for modifying a frame synchronization clock signal on the control track to have a selectable one of a plurality of duty cycle patterns.

23. A method of eliminating commercial messages during playback of a television program recorded on a recording medium comprising the steps of:
   (a) detecting an event in the television signal as the television program is recorded;
   (b) storing data representative of a tape location for said detected event;
   (c) analyzing said detected event to classify a segment of the television signal adjacent to said detected event as one of commercial and non-commercial;

(d) marking the recording medium with a signal to identify said segment of the television signal if it is classified as commercial;

(e) replaying the recorded television program such that said segment is replayed at a normal rate if it is classified as non-commercial and is replayed at a higher than normal rate if it is classified as commercial.

24. The method of claim 23 wherein the recording medium is a video tape and said marking step comprises writing a mark on a control track of the video tape.

25. The method of claim 24 wherein said mark comprises a first mark proximate to a beginning of said segment of the television signal.

26. The method of claim 25 further comprising the step of writing a second mark on the recording medium proximate to an ending of said segment of the television signal.

27. The method of claim 26 wherein the first and second marks each comprise a frame synchronization clock signal having respective first and second duty cycle patterns different from each other.

28. The method of claim 27 wherein the control track normally has a frame synchronization clock signal having a third duty cycle pattern different from both of the first and second duty cycle patterns.

29. The method of claim 28 wherein the first duty cycle pattern is a repeating sequence of a first duty cycle $D_1$ and a second duty cycle $D_2$ of the form $D_1D_2D_1D_2 \ldots$ 30. The method of claim 29 wherein the second duty cycle pattern is a repeating sequence of $D_1$ and $D_2$ of the form $D_1D_2D_2D_1D_2D_2 \ldots$ 31. The method of claim 30 wherein the third duty cycle pattern is a substantially constant duty cycle having a value approximately equal to one of $D_1$ and $D_2$.

32. The method of claim 26 wherein the second mark begins substantially before the ending of said segment of the television signal.

33. The method of claim 23 wherein the event comprises a television frame in which a video component of the television signal remains below a predetermined threshold.

34. The method of claim 23 wherein the event comprises a television frame in which an audio component of the television signal remains below a predetermined threshold.

35. The method of claim 23 wherein the event comprises a television frame in which a video component of the television signal signal remains at a substantially constant level.

36. The method of claim 23 wherein the event comprises a pair of video image changes in rapid succession.

37. A device for recording a television signal on a recording medium, said television signal carrying a television program, and for replaying the television program from the recording medium, said device comprising:

means for detecting events in the television signal as the television program is recorded;

means for analyzing one of said detected events by looking for a neighboring detected event within a plurality of time windows; means for classifying a segment of the television signal adjacent to said one detected event as commercial if said neighboring detected event is found within any one of said plurality of time windows and for otherwise classifying said segment of the video signal as non-commercial;

means for storing a classification result for said segment of the television signal together with data representative of a location of said segment of the television signal on the recording medium;

means for replaying the recorded television program from the recording medium at a normal rate of play during segments of the television signal classified as non-commercial and for replaying the recorded television program at a higher than normal rate of play during segments of the television classified as commercial.

38. The device of claim 37 wherein the means for detecting events comprises a circuit for detecting frames of the television signal in which a video component of the television signal remains below a predetermined threshold.

39. The device of claim 37 wherein the means for detecting events comprises a circuit for detecting frames of the television signal in which an audio component of the television signal remains below a predetermined threshold.

40. The device of claim 37 wherein the means for analyzing the detected events comprises means for determining if a first detected event has a neighboring second detected event within one of a plurality of time windows.

41. The device of claim 37 wherein the recording medium is a video tape and the means for automatically marking the video tape comprises a head for magnetically encoding a control track of the video tape.

42. The device of claim 41 wherein the means for automatically marking the video tape further comprises a circuit for modifying a frame synchronization clock signal on the control track to have a selectable one of a plurality of duty cycle patterns.

* * * * *

UNITED STATES PATENT AND TRADEMARK OFFICE
CERTIFICATE OF CORRECTION

PATENT NO. : 5,696,866
DATED : December 9, 1997
INVENTOR(S) : Iggulden et al.

It is certified that error appears in the above-identified patent and that said Letters Patent is hereby corrected as shown below:

Title page,
Item [21], Application number, please delete "304,781" and insert -- 08/304,781 --.
Item [63], please delete "Continuation-in-part of Ser. No. 177,813, Jan. 4, 1994, which is a continuation-in-part of Ser. No. 2,782, Jan. 8, 1993, Pat No. 5,333,091, and Ser. No. 103,067, Aug. 6, 1993, Pat No. 5,455,630" and insert -- Continuation-in-part of Ser. No. 08/177,813, Jan. 4, 1994, which is a continuation-in-part of Ser. No. 08/002,782, Jan. 8, 1993, Pat No. 5,333,091, and Ser. No. 08/103,067, Aug. 6, 1993, Pat No. 5,455,630 --.
Item [56], References Cited, patent number 4,587,572, please delete date "5/1986" and insert -- 4/1983 --.
Item [56], References Cited, patent number 4,703,311, please delete date "10/1987" and insert -- 11/1987 --.
Item [56], References Cited, patent number 4,750,213, please delete class/sub-class number "455/107" and insert -- 455/67 --.
Item [56], References Cited, patent number 5,151,788, please delete class/sub-class number "358/908" and insert -- 358/188 --.

Signed and Sealed this

Thirtieth Day of October, 2001

Attest:

NICHOLAS P. GODICI
Attesting Officer    Acting Director of the United States Patent and Trademark Office